UNITED STATES PATENT OFFICE.

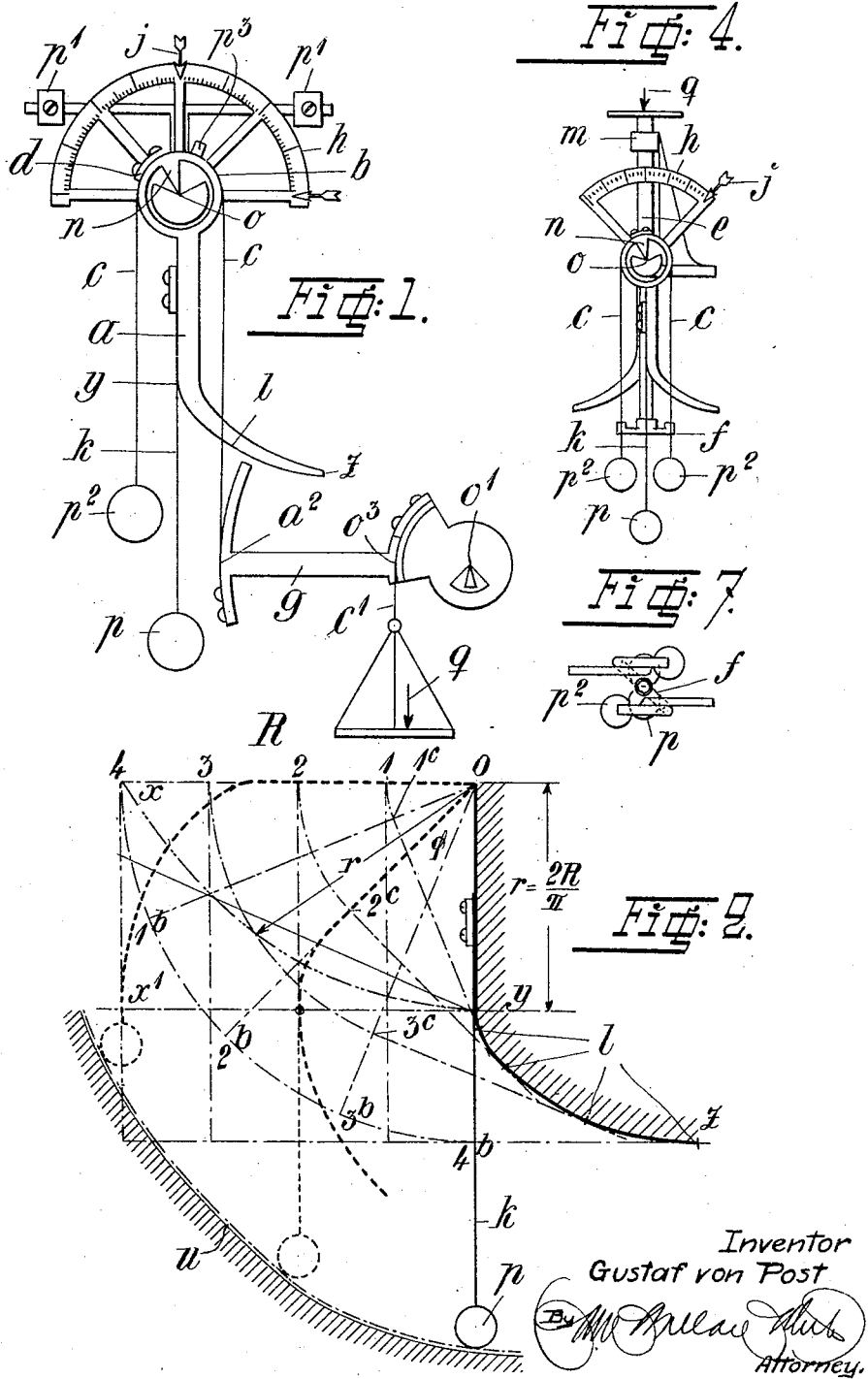

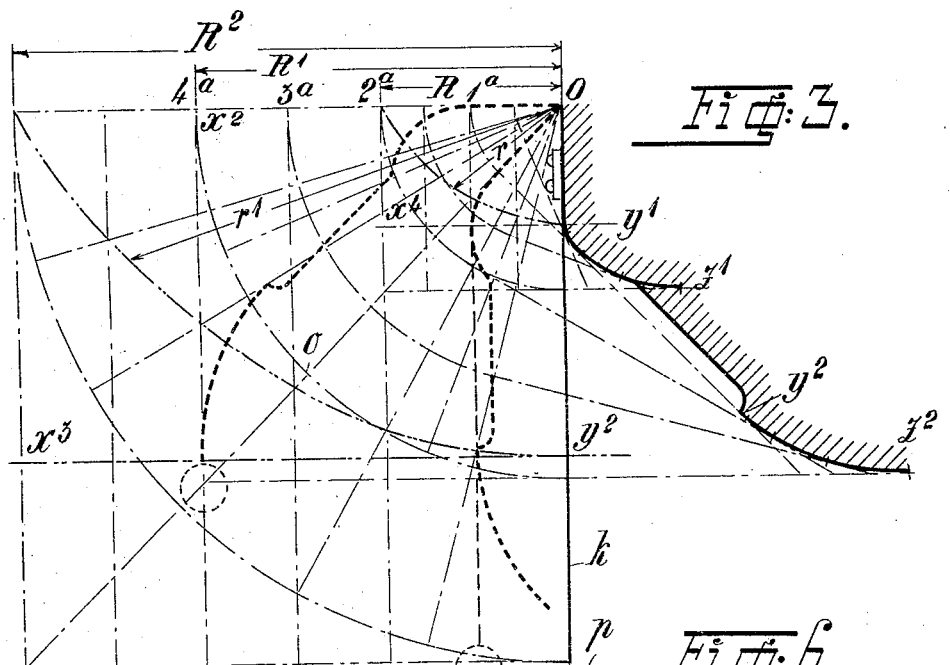
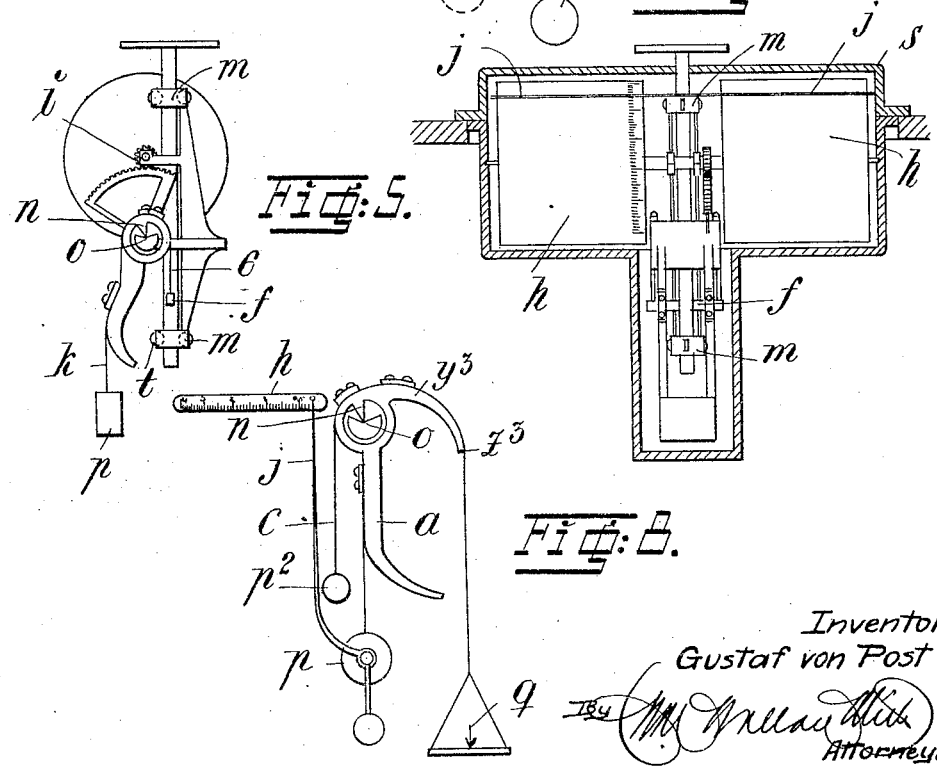

GUSTAF von POST, OF STOCKHOLM, SWEDEN.

AUTOMATIC BALANCE WEIGHING APPARATUS.

1,184,703.   Specification of Letters Patent.   Patented May 23, 1916.

Application filed December 16, 1915. Serial No. 67,272.

*To all whom it may concern:*

Be it known that I, GUSTAF VON POST, a subject of the King of Sweden, residing at Nos. 46–48 Nybrogatan, Stockholm, Sweden, have invented new and useful Improvements in Automatic Balance Weighing Apparatus, of which the following is a specification.

In automatic or self-recording weighing apparatus without loose weights the difficulties of graduating the scale on their index apparatus in a predetermined manner have proved nearly insurmountable, and it has therefore been necessary to adjust manually the scale according to the balance or vice versa, which in both cases involves a great trouble and waste of time.

According to the present invention, such a weighing apparatus is provided, founded upon the balance principle and of the kind where the load on one side and a constant weight on the other side of the pivoting point of the balance are suspended in flexible members in the form of bands or the like, said flexible members being led over curved surfaces of such shape as will permit their mechanical and uniform manufacturing, and of such function as will enable the scale graduation to be performed in advance with mathematical accuracy.

The invention is illustrated in the accompanying drawing in which—

Figure 1 is a diagrammatical view of a weighing apparatus of this type. Figs. 2 and 3 are two constructional drawings for giving the balance arms their shape. Fig. 4 shows a form of a weighing apparatus in a front view and Fig. 5 another form in a front view, while Fig. 6 shows the same apparatus inserted in a casing adapted to be placed on a counter, as viewed in a front view, partially in section. Fig. 7 is a plan view of Fig 4 with some details removed. Fig. 8, finally, shows a diagrammatical view of a weighing apparatus with a non-uniformly graduated scale.

The weighing balance $a$, Fig. 1, in its upper part is shaped as a round disk which, however, also may be formed, according to Fig. 8, as a lever $y^3$—$z^3$. A flexible member $c$ in the shape of a band or the like is carried over said disk or lever and secured thereto by means of a block $d$. The member $c$, which also may be replaced by two members, each secured to the disk $b$, at one end supports the load $q$ either directly by the scale shank $e$ and the cross piece $f$ or indirectly by a transmission mechanism $g$. The latter may consist of two concentrical circular segments on a shaft $o'$, one of said segments carrying the load $q$ by means of a member $c'$ while the other segment is connected to the member $c$. The winding-off points $o^3$ and $o^2$ of said members then always lie at constant distances from the shaft $o'$. The other end of the member $c$ carries a counterweight $p^2$.

$p'$, $p'$ are other adjusting weights which are fixedly or adjustably connected to the part $a$ or $b$.

$h$ is a dial which moves with the balance $a$, whether it is directly fixed thereto, as in Figs. 1 and 4, or connected thereto by a transmission device $i$, as in Figs. 5 and 6. Stationary index members are placed in front thereof, or the index members may be movable and the dial stationary. The index may finally, as shown in Fig. 8, be connected to the counterweight $p$.

The balance $a$, beneath its pivoting shaft $o$, carries a weight $p$ suspended in a flexible member $k$, which is carried over a curved surface $y$—1—$z$ on the balance. Above the shaft $o$, the balance supports the load $q$ in the manner already described.

$m$ (Figs. 4, 5, 6) are stationary parallel guides, provided with bearing rollers $t$.

$n$ are edge bearings or other suitable pivoting devices which make the balance $a$ easily movable around the shaft $o$.

$u$ is a wall adjacent to the path of the weight $p$, as shown in Fig. 2.

$s$ is a casing protecting the scale $h$ (Fig. 6) and provided with observation openings, not shown.

The invention is based on the construction of the curve $y$—1—$z$. Fig. 2 illustrates this construction. Assuming that the weight $p$, upon a rotation of the balance through 90°, shall obtain a lever arm $=R$, the curve may be mathematically constructed in the following manner: A circle quadrant with the radius R and the point $o$ as center, and limited by one vertical and one horizontal radius, is drawn. The vertical radius is supposed to coincide with the left hand edge of the balance arm. The horizontal radius is divided into a number of equal parts, for instance four parts by the points 1, 2, 3. The arc is divided in as many equal parts in the points $1^b$, $2^b$, $3^b$. Through the points 1, 2, 3, ordinates are drawn, and through the points $1^b$, $2^b$, $3^b$ radii. These ordinates and radii intersect along a curve $y$—$x$ corresponding to the formula $$r = \frac{R\varphi}{\sin.\varphi} \frac{2}{\pi};$$

where R is the radius of the circle quadrant, $r$ the radius vector and $\varphi$ the angle between the latter and the vertical radius. If the angle $\varphi$ is infinitely small, sin. $\varphi$ is approximately equal to $\varphi$. The curve $y$—$x$ therefore will intersect the vertical limiting radius under right angles in a point $y$ at a distance $$\frac{2R}{\pi}$$

from the pivoting point of the balance. This point $y$ is taken as the point of origin for the desired curve $y$—1—$z$ the shape of which determines the path of the flexible member carrying the weight $p$ (Fig. 1) or, as the case may be, also for the surface carrying the load $q$, Fig. 8. The points 1 on this curve are obtained by drawing circular arcs around $o$ as center from the points 1, 2, 3 on the horizontal radius to the corresponding radii drawn to the points $1^b$, $2^b$, $3^b$ on the arc. From the intersecting points $1^c$, $2^c$, $3^c$ thus obtained perpendiculars are drawn to the radii, said perpendiculars touching the curve $y$—1—$z$ in points the distances of which from said intersecting points always are equal to $$\frac{2R}{\pi}.$$

The curve thus obtained has the property that the touching point of a vertical tangent thereto always coincides with the horizontal line $y$—$x'$. For $\varphi = 90°$, the vertical tangent coincides with the ordinate through point 4.

A mechanical production of the aforesaid curve $y$—1—$z$ can be obtained with mathematical exactness by fixing the unfinished balance rotatably around its axis $o$, for instance in a milling machine, and causing a cutting tool to act thereupon at the point of origin $y$ determined in the manner specified. A rotative motion is then imparted to the working piece, said motion being mechanically combined, in a known manner, with a rectilinear feeding motion of the tool along the line $y$—$x'$. The speeds of the rotation of the balance and of the feeding of the tool can be so chosen with respect to each other that the tool is moved a distance $= R$ in the same time as the workpiece rotates through an angle $= 90°$. By such a method, a constant weight $p$ suspended in a flexible member, which is laid over a curved path of the shape thus obtained, will counteract a variable load $q$ suspended in a flexible member laid over a path concentrical around $o$ (Fig. 1) in such manner, that the weight of the variable load can be read on an index apparatus ($j$, $h$) connected to the balance and provided with a uniformly graduated scale ($h$).

Fig. 3 illustrates the arrangement of a weighing balance adapted for an apparatus in which the weight of a smaller load is indicated on one portion of the scale, provided with a long, uniform graduation, while the remainder of the scale, which has a shorter, also uniform graduation, is adapted for the indication of larger loads. For this purpose, the balance is provided with two curved paths over which the flexible member carrying the weight is alternately laid at a smaller or greater rotation of the balance, while the flexible member carrying the load is laid over a curved path which may be circular. Each of the first named paths $y'$—$z'$ and $y^2$—$z^2$ is produced as illustrated in Figs. 2 and by a similar process. The point of origin of the lower curve $y^2$—$z^2$ is determined in such way, that in a winding-off point corresponding to a certain angle of deviation $\varphi$ of the balance (in the example shown 45°) a tangent is drawn to the upper curve and then a certain point $y^2$ on this curve is chosen as the point of origin of the other curve. The position of this point is determined with respect to the desired proportion between the scales for the greater and smaller loads. In the example shown in the drawing, the boundary point between the scales corresponds to a deviation of the balance of 45°. The manufacturing and the manner of operation of such a balance, compared with that illustrated in Fig. 2, is otherwise clear from the drawing. In the example chosen, at an angle of deviation $\varphi$ of the balance smaller than 45°, a longer scale graduation is obtained than at angles larger than 45°. The distances between the scale marks, however, will be equal on either side of the mark corresponding to an angle of deviation of 45°.

The above described construction relates to a balance of an automatic weighing apparatus which states the weight of a ware with mathematical exactitude on an index apparatus having a uniformly divided scale. The same design may, however, within certain limits be used for a certain desired non-uniform scale graduation. After weighing apparatus have come into use, in which also price statements are indicated, it would be of advantage, for facilitating the combination of the apparatus with a counting mechanism, to give the scale a non-uniform division, and this can be easily accomplished in accordance with the present invention, as can be seen from Fig. 8. Here, the curve $y^3$—$z^3$ of the load is entirely congruent with that of the weight, but by adapting the curves in a suitable manner any desired scale division can be obtained, the balance being shaped according to one or more curves. By an uncareful handling of the load $q$, an oscillating motion could be imparted to the weight $p$ with respect to the balance $a$. This is avoided by placing a wall $u$ in close relation to the path of the weight (Fig. 2).

In Figs. 1, 4–6 and 8 there is illustrated how the balance is destined to be arranged. In Figs. 4 and 7, the weighing apparatus is provided with two balances moving toward each other, and in Figs. 5 and 6 with two balances moving in parallel, which is suitable if the weighing scale shall be situated above the mechanism. The shank of said scale then can obtain a straight vertically reciprocating motion. In this motion, said shank $e$ is guided by the parallel supports $m$ and rests on the cross piece $f$ which is carried at both ends by the members $c$. The parallel guides can be arranged in any known manner. In Fig. 5, they consist of heads connected to the frame and carrying freely movable rollers $t$ which are directed radially toward the shank and support the latter around its periphery. The counterweight $p^2$ is also supported by the members $c$. The suspending points of the cross piece $f$ are in both cases arranged centrally around the shank $e$ and vertically beneath the winding-on and winding-off points of the disks $b$. As shown in Fig. 5, the counterweights $p^2$ may be dispensed with, a portion of the curve being then employed for taring the apparatus, as the proportion between the rotation of the balance and index apparatus may be made comparatively greater. The index apparatus is shown in Figs. 5 and 6 to consist of two horizontal cylinders to which a movement of rotation is imparted by means of the transmission mechanism, and on which the scale $h$ is placed. As illustrated, the scale can be covered by a hood $s$ having openings through which the indications can be read off. The apparatus, finally, can be so arranged as to be placed on a table or counter for saving space, and then the weighing scale and the observation openings can be placed above and the rest of the mechanism beneath the table, as shown in Fig. 6.

The operation of the balance weighing apparatus thus described is only depending upon one or more constant weights. An apparatus calculated for one maximum load therefore can be adapted in the most easy manner for any load by replacing its weights by other ones and the scale by a scale graduated in accordance therewith. Hereby the same size and type of apparatus may serve different purposes.

Having now particularly described the nature of my invention and the manner of its operation, what I claim is:

1. In automatic balance weighing apparatus, a balance having a pivoting point, a load receiver, a counterweight, flexible members carrying said load receiver and counterweight, said balance having curved surfaces adapted to support and guide said flexible members, either of said surfaces consisting of two portions at different distances from the pivoting point, each of said portions being determined by the condition that the unwinding point of the band therefrom at a certain angle of deviation of the balance lies on the same vertical line as a determining point on an originally horizontal line through the pivoting point, said determining point lying at a distance from said pivoting point varying proportionally to the angle of deviation, and an index apparatus connected to said balance.

2. In an automatic balance weighing apparatus, a balance having a pivoting point, a load receiver, a counterweight, flexible members carrying said load receiver and counterweight, said balance having curved surfaces adapted to support and guide said flexible members, either of said surfaces having a contour such that the unwinding point of the band therefrom lies always on the same horizontal line and is laterally displaced in proportion to the angular displacement of the balance, and an index apparatus connected to said balance.

3. In an automatic balance weighing apparatus, a balance having a pivoting point, a load receiver, a counterweight, flexible members carrying said load receiver and counterweight, said balance having curved surfaces adapted to support and guide said flexible members, either of said surfaces having a contour such that the unwinding point of the band therefrom lies always on a horizontal line located below the balance pivot a distance equal to $2/\pi$ times the lateral displacement of said unwinding point corresponding to an angular displacement of the balance of one quarter of a revolution, and such that the lateral displacement of said unwinding point is proportional to the angular displacement of the balance; and an index apparatus connected to said balance.

4. Method of producing curved surfaces for use in automatic balance weighing apparatus consisting in mounting the working piece in a milling machine, causing it to rotate around an axis and causing a tool to be positively fed toward it along a straight line which does not intersect said axis with a rectilinear speed proportional to the angular speed of the working piece.

5. A method of producing curved surfaces for use in automatic balance weighing apparatus consisting in rotating the work about an axis, and advancing the cutting tool along a straight line at a linear speed proportional to the angular speed of the work, the perpendicular distance from the axis to the said line being equal to $2/\pi$ times the linear movement of the tool per quarter revolution of the work.

In testimony whereof I have signed my name to this specification in the presence of two subscribing witnesses.

GUSTAF von POST.

Witnesses:
BIRGER NORDFELDT,
H. FELANDER.

Copies of this patent may be obtained for five cents each, by addressing the "Commissioner of Patents, Washington, D. C."